United States Patent [19]

Lee

[11] Patent Number: 5,647,631

[45] Date of Patent: Jul. 15, 1997

[54] VEHICLE DOOR

[75] Inventor: Young-Woong Lee, Seoul, Rep. of Korea

[73] Assignee: Kia Motors Corporation, Seoul, Rep. of Korea

[21] Appl. No.: 707,786

[22] Filed: Sep. 5, 1996

[51] Int. Cl.⁶ .................................................. B60J 5/04
[52] U.S. Cl. ........................ 296/146.6; 296/146.5; 296/188
[58] Field of Search .................... 296/146.6, 146.5, 296/188; 49/502

[56] References Cited

U.S. PATENT DOCUMENTS

| | | | |
|---|---|---|---|
| 3,964,208 | 6/1976 | Renner et al. | 296/146.6 X |
| 5,364,157 | 11/1994 | Siedlecki | 296/146.6 |
| 5,470,125 | 11/1995 | Yamazaki | 296/146.6 |

FOREIGN PATENT DOCUMENTS 96-3188   4/1996   Rep. of Korea .

*Primary Examiner*—Joseph D. Pape

[57] ABSTRACT

A vehicle door comprising: an inner panel having an opening; an outer panel having a guide; and a reinforcement member having an inner protrusion for being inserted to the opening of the inner panel and an outer protrusion for sliding along the guide of the outer panel.

6 Claims, 2 Drawing Sheets

VEHICLE DOOR

BACKGROUND OF THE INVENTION

This invention relates to a vehicle door, more specifically to a vehicle door which has a reinforcement member between an inner and an outer panel thereof in order to prevent thermal deformation of the panels.

As shown in FIG. 1, a general door for a passenger car or freight car has an inner panel 20 and an outer panel 30 which are spot welded with each other, and which are usually made of steel for safety.

However, recently in order to satisfy light weight requirements of a vehicle, vehicle doors made of light material such as compound material or fiber reinforced plastic are adapted to a sports car or an electric vehicle instead of steel-made doors.

By the way, since such light material has a bigger thermal expansion coefficient than steel, it is weak to temperature variation, which may cause door to expand or contract severely. If a vehicle door is weak to temperature variation, designers have difficulties in designing a vehicle door.

SUMMARY OF THE INVENTION

The present invention has been made in an effort to solve the above described problems of the light material door for vehicles.

It is an object of the present invention to provide a vehicle door made of light material such as compound material or fiber reinforced plastic, which cannot be easily deformed by temperature variation.

To achieve the above object, the present invention provides a vehicle door comprising: an inner panel having an opening; an outer panel having a guide; and a reinforcement member having an inner protrusion for being inserted to the opening of the inner panel and an outer protrusion for sliding along the guide of the outer panel.

It is another feature of the invention that the inner protrusion of the reinforcement member has a groove.

It is still another feature of the invention that the groove of the inner protrusion is narrow and deep shaped in vertical direction.

It is still another feature of the invention that the outer protrusion of the reinforcement member defines a center protrusion and at least one peripheral protrusion.

BRIEF DESCRIPTION OF THE DRAWINGS

The foregoing and other objects of the present invention will become more apparent from the detailed description below when taken in conjunction with the following drawings in which.

DETAILED DESCRIPTION OF THE PREFERRED EMBODIMENT

Preferred embodiment of the present invention will now be described in detail with reference to the accompanying drawings.

Figure 3:
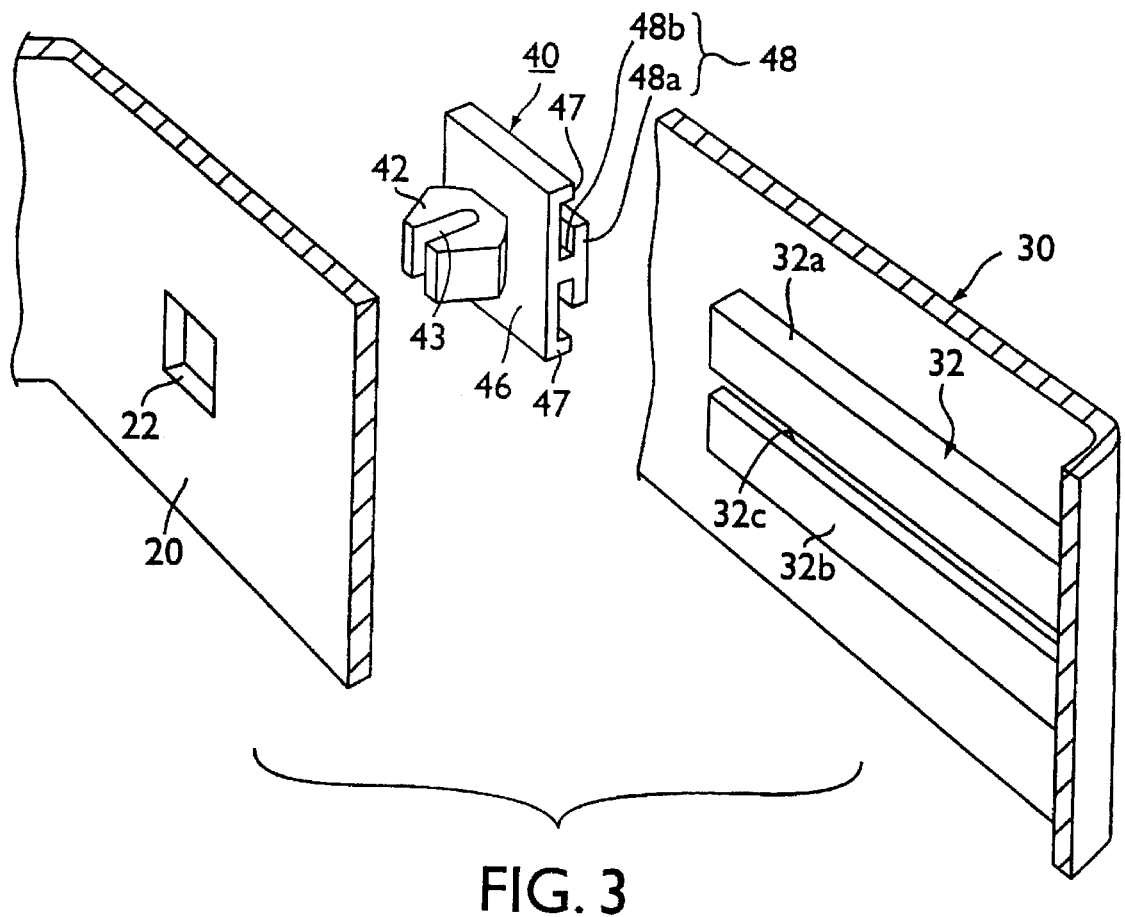
FIG. 3 is an exploded view of the vehicle door of FIG. 2.

As shown in FIG. 3, the vehicle door of this embodiment includes an inner panel 20 having an opening 22, an outer panel 30 having a guide 32, and a reinforcement member 40 having an inner protrusion 42 and outer protrusions 47 and 48.

Figure 1:
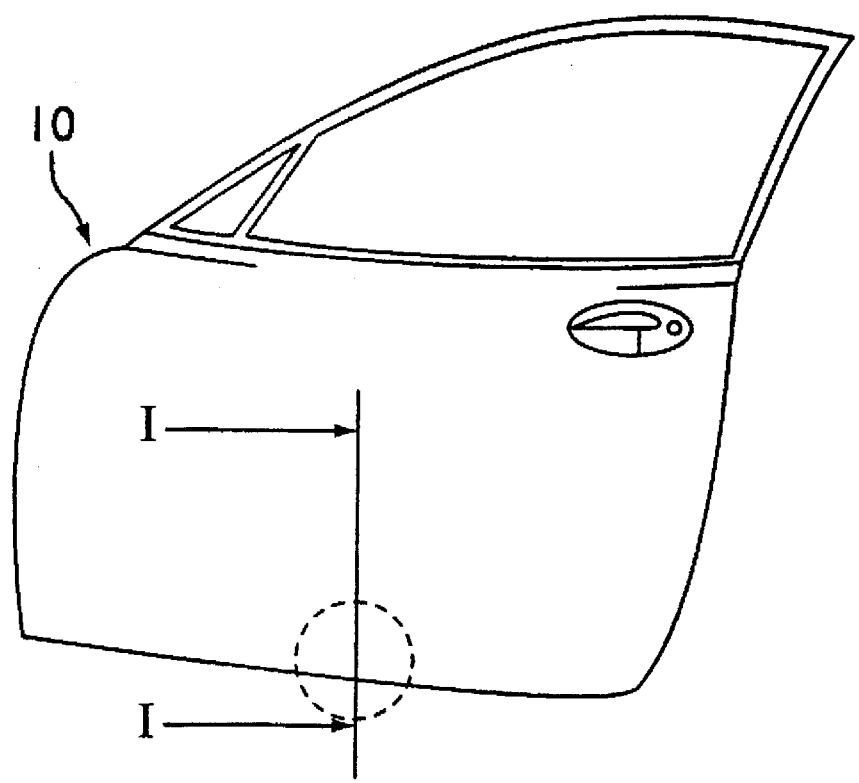
FIG. 1 is a side view of a conventional vehicle door.
Figure 2:
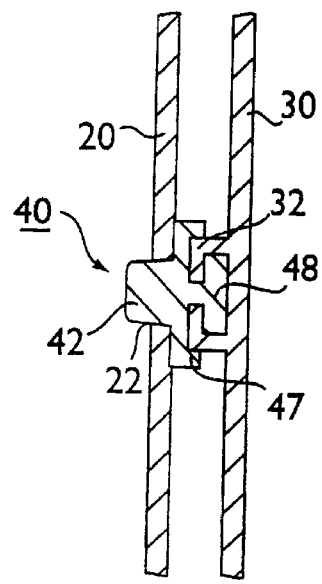
FIG. 2 is a partial section view of a vehicle door in accordance with this invention along section lines I—I of FIG. 1.

The inner protrusion 42 of the reinforcement member 40 is for being inserted to the opening 22 of the inner panel 20 and the outer protrusions 47 and 48 are for sliding along the guide 32 of the outer panel 30, as well shown in FIG. 2.

The opening 22 is rectangular shaped and the inner protrusion 42 of the reinforcement member 40 has a deep groove 43 so that it can be shortened in width and be inserted in.

The outer protrusions 47 and 48 of the reinforcement member 40 consist of a pair of peripheral protrusions 47 and a center protrusion 48. The center protrusion 48 extends from a body 46 in an outer direction and lies in the longitudinal direction of the vehicle. The outer end portion 48a of the center protrusion 48 has a wider width than the other portion 48b of the center protrusion 48. The peripheral protrusions also lie in the longitudinal direction of the vehicle.

The guide 32 of the outer panel 30 defines an upper guide 32a and a lower guide 32b at a predetermined distance which is slightly longer than the width of the portion 48b of the center protrusion 48 of the reinforcement member 40 so that the center protrusion 48 can slide between the upper and the lower guide 32a and 32b. And also the guide 32 has a predetermined space 32c for the end portion 48a of the reinforcement member 40. The height of each guide 32a and 32b is determined by the position of the peripheral protrusion 47 of the reinforcement member 40, which can be understood in FIG. 2.

The assembled state of the reinforcement member 40 between the inner panel 20 and the outer panel 30 is well shown in FIG. 2. The assembling order of the reinforcement member 40 with the inner and outer panel 20 and 30 is not determined in this embodiment. That is, the reinforcement member 40 can be assembled with the inner panel 20 before assembled with the outer panel 30. Of course, the other assembling order can be accepted regarding assembling order of other parts of the vehicle door.

Due to the reinforcement member 40 assembled with the inner panel 20 and the outer panel 30 of the vehicle door, deformation of the panels 20 and 30 in accordance with the temperature variation can be much reduced. Also this invention can be adapted to a conventional vehicle door made of steel.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A vehicle door comprising:
    an inner panel having an opening;
    an outer panel having a guide; and
    a reinforcement member having an inner protrusion for being inserted to the opening of said inner panel and an outer protrusion for sliding along the guide of said outer panel.

2. A vehicle door according to claim 1, wherein the inner protrusion of said reinforcement member has a groove.

3. A vehicle door according to claim 2, wherein the groove of the inner protrusion is narrow and deep shaped in vertical direction.

4. A vehicle door according to claim 1, wherein the outer protrusion of said reinforcement member defines a center protrusion and at least one peripheral protrusion.

5. A vehicle door according to claim 4, wherein an end portion of the center protrusion of said reinforcement member has a wider width than the other portion of the center protrusion, the guide of the outer panel defines an upper guide and a lower guide at a predetermined distance with each other, and each of the upper and lower guide has a space for the end portion of the center protrusion of said reinforcement member to slide along.

6. A vehicle door according to claim 1, wherein the opening of said inner panel is rectangular shaped.

* * * * *